United States Patent [19]
Bronicki et al.

[11] Patent Number: 5,598,706
[45] Date of Patent: Feb. 4, 1997

[54] METHOD OF AND MEANS FOR PRODUCING POWER FROM GEOTHERMAL FLUID

[75] Inventors: Lucien Y. Bronicki, Yavne; Moshe Grassiani, Herzliya; Nadav Amir, Rehovot, all of Israel

[73] Assignee: Ormat Industries Ltd., Yavne, Israel

[21] Appl. No.: 145,230

[22] Filed: Nov. 3, 1993

Related U.S. Application Data

[63] Continuation-in-part of Ser. No. 22,494, Feb. 25, 1993, abandoned.

[51] Int. Cl.$^6$ .................................................. F03G 4/00
[52] U.S. Cl. ................................................ 60/641.2; 60/655
[58] Field of Search .......................... 60/641.5, 641.2, 60/655, 689; 210/696

[56] References Cited

U.S. PATENT DOCUMENTS

| | | | |
|---|---|---|---|
| 4,244,190 | 1/1981 | Lieffers | 60/641.2 |
| 4,542,625 | 9/1985 | Bronicki | 60/641.2 |
| 5,038,567 | 8/1991 | Moritz | 60/641.5 |
| 5,440,882 | 8/1995 | Kalina | 60/641.2 |

*Primary Examiner*—Leonard E. Heyman
*Attorney, Agent, or Firm*—Donald M. Sandler

[57] ABSTRACT

Power is produced from geothermal fluid containing non-condensable gases whose main constituent is carbon-dioxide. The geothermal fluid is separated into steam and geothermal liquid, the steam being applied to a steam turbine which produces power. The steam exiting the turbine indirectly condensed by an organic fluid liquid which is vaporized and used to run at least one organic vapor turbine for producing power. Organic vapor exiting the organic vapor turbine is condensed and preheated by the steam condensate. Heat extracted from the geothermal liquid is used to run another organic vapor turbine producing power and cooled geothermal liquid which is combined with the cooled steam condensate to form a mixture to which the non-condensable gases are added to form an effluent that is injected into a re-injection well. Carbon dioxide in the non-condensable gases substantially dissolves in the geothermal liquid cooled by the cooled steam condensate reducing the pH of the effluent and thus reducing mineral scale precipitation.

13 Claims, 3 Drawing Sheets

METHOD OF AND MEANS FOR PRODUCING POWER FROM GEOTHERMAL FLUID

RELATED APPLICATION

This application is a continuation-in-part of application Ser. No. 08/022,494 filed Feb. 25, 1993, now abandoned.

TECHNICAL FIELD

This invention relates to a method of and means for producing power from geothermal fluid and enhancing the prevention of carbon dioxide and other minor constituents of non-condensable gases from exhausting into the atmosphere.

BACKGROUND OF THE INVENTION

Lately, the use of geothermal energy has become more popular. However one of the problems in using this energy is that many of the available geothermal resources contain sizable amount of non-condensable gases including for example carbon dioxide and hydrogen sulfide, etc. many of these gases being pollutants which must be disposed of in an environmentally safe manner.

It is therefore an object of the present invention to provide a new and improved method of and means for producing power from geothermal fluid and enhancing the prevention of non-condensable gases often containing relatively large quantities of carbon dioxide and other minor constituents from exhausting into the atmosphere which substantially overcomes or significantly reduces the disadvantages outlined above.

BRIEF DESCRIPTION OF THE INVENTION

In accordance with present invention, a method of and means for producing power from geothermal fluid and enhancing the prevention from exhausting into the atmosphere of non-condensable gases particularly when carbon dioxide is the main constituent of the non-condensable gases and other minor constituents of non-condensable gases exist is provided, the geothermal fluid being produced from a production well originating from a geothermal fluid resource. The method comprises the steps of;

a) separating the geothermal fluid at a pressure preferably at least six atmospheres absolute into steam, containing gaseous carbon dioxide and other minor constituents of non-condensable gases, and geothermal liquid;

b) supplying said steam to a steam turbine for producing power and supplying lower pressure steam from said steam turbine after power has been produced to at least one steam condenser operating preferably at a pressure above atmospheric pressure indirectly cooled by an organic fluid for producing steam condensate and organic fluid vapor;

c) extracting carbon dioxide and other minor constituents of non-condensable gases from said steam condenser preferably at a pressure above atmospheric;

d) supplying said organic fluid vapor to at least one organic turbine for producing power and supplying lower pressure organic fluid vapor from said at least one organic turbine after power has been produced to at least one air cooled organic condenser for producing organic fluid condensate which is supplied to at least one preheater for preheating said organic fluid condensate with said steam condensate producing cooled steam condensate and preheated organic fluid, the preheated organic fluid being supplied back to said at least one steam condenser completing the cycle of the organic Rankine cycle turbine;

e) supplying said geothermal liquid to at least one other preheater and at least one vaporizer for extracting heat from said geothermal liquid and transferring said extracted heat to an organic fluid for preheating said organic fluid and producing organic fluid vapor as well as cooled geothermal liquid;

f) supplying said organic fluid vapor to at least one other organic turbine for producing power and supplying lower pressure organic fluid vapor from said at least one other organic turbine after power has been produced to at least one other air-cooled organic condenser for producing organic fluid condensate which is supplied back to said at least one other preheater completing the organic fluid cycle of the organic Rankine cycle turbine;

g) supplying said cooled steam condensate to said cooled geothermal liquid for producing a mixed, cooled and diluted geothermal liquid, the temperature of which is lower than the temperature of said cooled geothermal liquid, and introducing said compressed carbon dioxide and compressed other minor constituents of non-condensable gases to the mixed, cooled and diluted geothermal liquid for substantially dissolving said carbon dioxide in said mixed, cooled and diluted geothermal liquid, the dissolving of carbon dioxide bringing about a drop of about preferably between 0.4 and 2.0 units of the liquid pH thus reducing mineral scale deposition from said mixed, cooled and diluted geothermal liquid; and h) injecting the mixed, cooled and diluted geothermal liquid after the carbon dioxide has been substantially dissolved therein into said injection well in said geothermal resource such that the inhibiting of scale deposition is enhanced in said injection well and in the geothermal resource reservoir.

Usually the scale comprises silica and calcite, and the enhanced inhibiting of scale deposition is produced by:

a) a delay in the polymerization of silica due to said drop in pH value of the mixed, cooled and diluted geothermal liquid as a consequence of said dissolving of the carbon dioxide; and b) a lowering the possible over saturation of silica as a consequence of the dilution produced by the addition of said steam condensate to said cooled geothermal liquid.

In an example of operating conditions, the temperature of the cooled geothermal liquid is about 140° C., the temperature of the cooled steam condensate is about 50° C. and the temperature of the mixed, cooled and diluted geothermal liquid is about 100° C. Furthermore, the pH of the cooled geothermal liquid can be at least 5.0. In addition, often the concentration of silica in the mixed, cooled and diluted geothermal liquid is at least 400 ppm, In accordance with the present invention, the injection well can be located in a distant location from the production well to give the injected geothermal liquid sufficient time to heat up in the reservoir as it make its way back to the production well.

In addition, in accordance with the present invention apparatus is provided for carrying out the above described method.

BRIEF DESCRIPTION OF THE DRAWINGS

An embodiment of the present invention is described by way of the example with reference to the accompanying drawing wherein.

DETAILED DESCRIPTION

Figure 1:
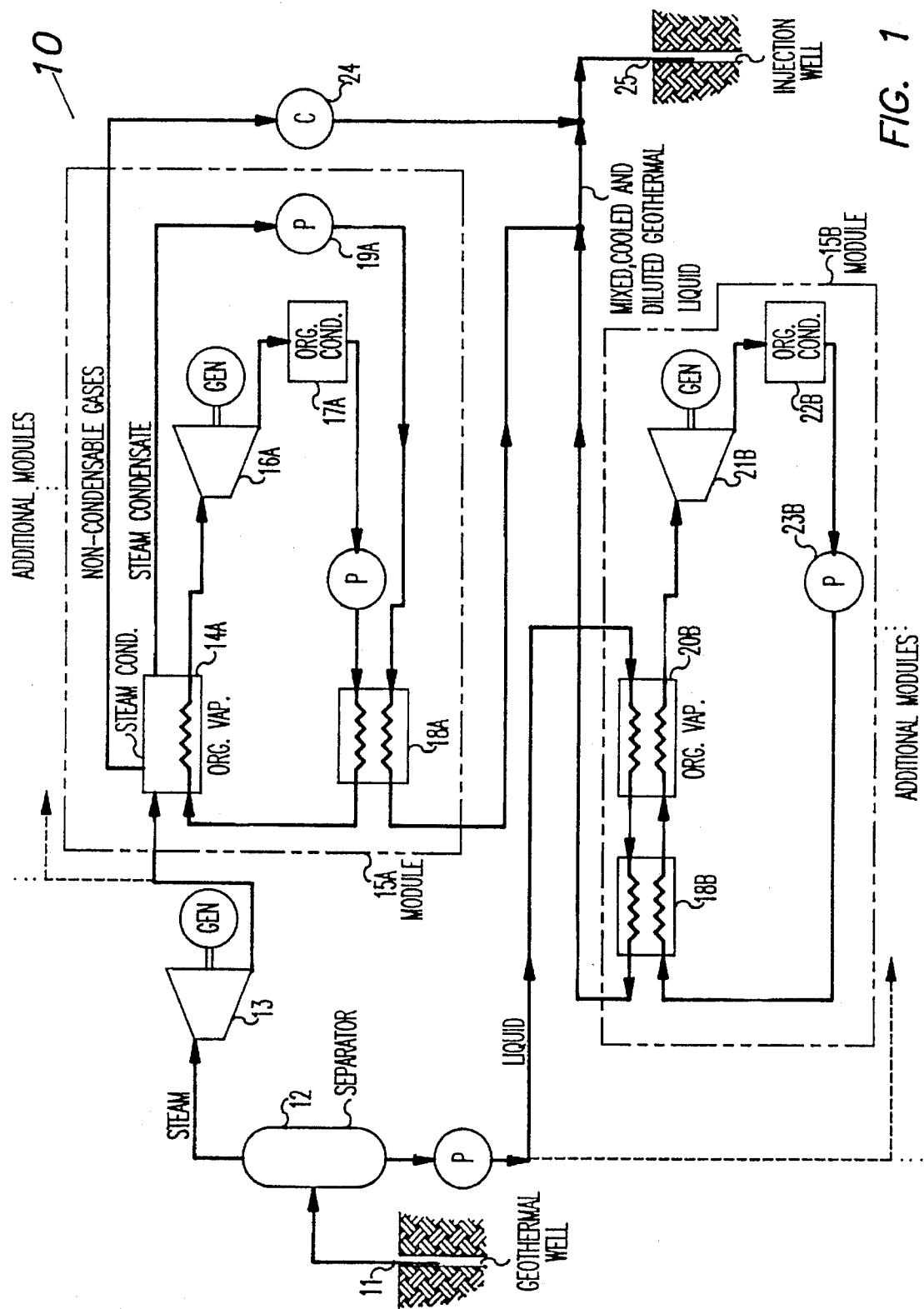
FIG. 1 is a block diagram which represents, in a schematic way, a power plant in accordance with the present invention.

Referring now to FIG. 1, reference numeral 10 designates a power plant for producing power from geothermal fluid containing non-condensable gases extracted from production well 11 originating from a geothermal fluid resource (not shown). often these gases comprise large quantities of carbon dioxide and other minor constituents. The geothermal fluid extracted from well 11 is separated in separator 12 into steam containing the non-condensable gases and geothermal liquid at a pressure preferably above 6 atmospheres. The steam is supplied to steam turbine 13 for producing power and lower pressure steam is exhausted from the steam turbine after power has been produced and supplied to steam condenser 14A which preferably operates at a pressure above atmospheric pressure and which is part of module 15A. Steam condenser 14A is cooled by organic fluid and produces organic fluid vapor and steam condensate with the non-condensable gases being extracted from the condensable preferably at above atmospheric pressure. Organic fluid vapor is supplied to organic turbine 16A for producing power and lower pressure organic fluid vapor is exhausted from the organic turbine after power has been produced. The lower pressure organic fluid vapor exhausted from the turbine is supplied to organic fluid condenser 17A, which is preferably air cooled and where it condenses and forms organic fluid condensate which is supplied to preheater 18A. In preheater 18A, steam condensate supplied to the preheater by pump 19A transfers heat contained therein to the organic fluid condensate and produces heated organic fluid liquid and cooled steam condensate. The heated organic fluid liquid is then supplied back to steam condenser 14A thus completing the organic Rankine cycle turbine power cycle in module 15A.

On the other hand, geothermal liquid separated from the steam by separator 12 is supplied to module 15B for heat extraction and production of power. The separated geothermal liquid is supplied to vaporizer 20B where it transfers heat to preheated organic fluid liquid having been preheated in preheater 18B and produces organic fluid vapor and heat depleted geothermal liquid which is supplied to preheater 18B. In preheater 18B, heat depleted geothermal liquid transfers heat to the organic fluid condensate and produces preheated organic fluid liquid which is supplied to vaporizer 20B and cooled geothermal liquid. The organic fluid vapor produced in vaporizer 18B is supplied to organic turbine 21B for producing power and lower pressure organic fluid vapor is exhausted from the turbine after power has been produced. The lower pressure organic vapor exhausted from the turbine after power has been produced is supplied to organic fluid vapor condenser 22B, which is preferably air cooled and produces organic fluid vapor condensate which is supplied using pump 23B back to preheater 19B and thus completes the organic Rankine cycle turbine power cycle for module 15B.

Cooled steam condensate exiting preheater 18A present in module 15A is added to cooled geothermal liquid exiting preheater 18B present in module 15B thus producing mixed, cooled and diluted geothermal liquid. Non condensable gases extracted from steam condenser 14A in module 15A are compressed by compressor 24 to at least the pressure of the mixed, cooled and diluted geothermal liquid and are the compressed gases introduced into the mixed, cooled and diluted geothermal liquid. The mixed, cooled and diluted geothermal liquid after the compressed gases have been introduced is then injected into injection well 25.

The present invention is particularly advantageous when the non-condensable gases are mainly carbon dioxide and other minor constituents of non-condensable gases are present since the solubility of carbon dioxide increases when the temperature of the liquid into which the carbon dioxide is introduced is relatively low e.g., around about 100° C. or less. By using the present invention, the solubility of the carbon dioxide in the non-condensable gases will be increased since the temperature of the mixed, cooled and diluted geothermal liquid will be relatively low since the steam condensate is cooled by extracting heat from it in preheater 18A and the geothermal liquid is also cooled since heat is extracted from it in vaporizer 20B and preheater 18B. By adding the compressed carbon dioxide to the mixed, cooled and diluted geothermal liquid, the carbon dioxide will substantially dissolve bringing about a drop of about preferably between 0.4 and 2.0 units of the pH of the liquid thus reducing mineral scale deposition from said mixed, cooled and diluted geothermal liquid.

Alternatively, the disposing of the carbon dioxide and other non-condensable can be achieved by compressing them and introducing them into the cooled steam condensate at a suitable pressure such that the carbon dioxide will substantially he dissolved in the cooled steam condensate, the condensate being thereafter disposed of or used in a suitable manner. For example, after adding the compressed non-condensable gases to the cooled steam condensate, the cooled steam condensate can be supplied to the cooled geothermal liquid using a pump, with the resulting mixed, cooled and diluted geothermal liquid containing the non-condensable gases being injected into an injection well. In this alternative, the carbon dioxide will substantially be dissolved in the cooled steam condensate since its temperature is relatively low having had heat extracted from it in preheater 17A. In addition, the power consumption will be decreased since the power consumed by the compressor used to compress the non-condensable gases will be relatively low since the pressure of the steam condensate exiting preheater 18A is relatively low (around one atmosphere) compared to the pressure of the mixed, cooled and diluted geothermal liquid described in relation to FIG. 1. Thus alternative is particularly advantageous when the amount of steam available is relatively large compared with the amount of geothermal liquid available.

While the above description refers only to modules 15A and 15B, the present invention also envisages the use of further modules similar to these and are to operate on the steam and geothermal liquid in a manner similar to the way modules 15A and 15B operate as described above.

Figure 2:
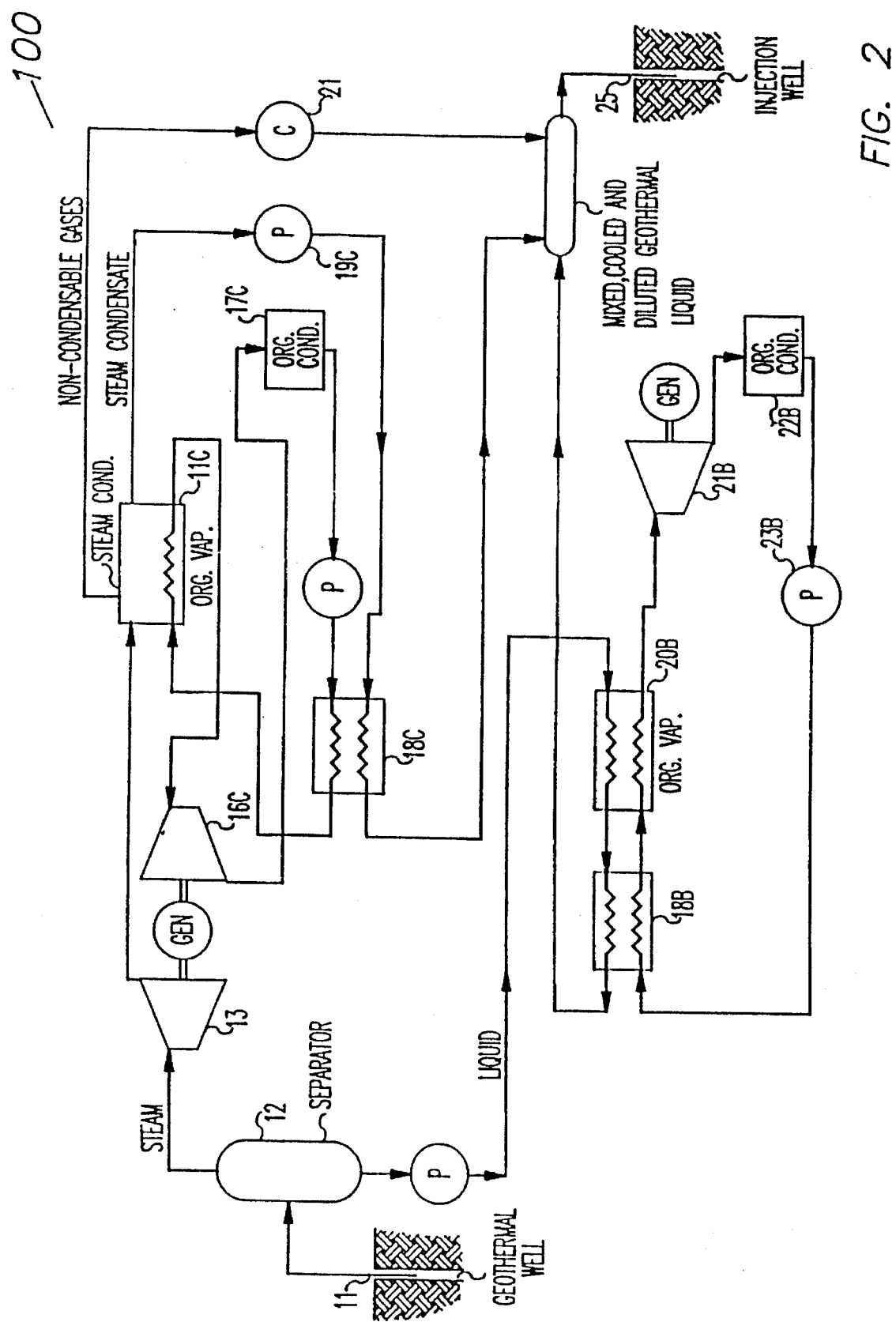
FIG. 2 is a block diagram which represents, in a schematic way, another embodiment of a power plant in accordance with the present invention.
Figure 3:
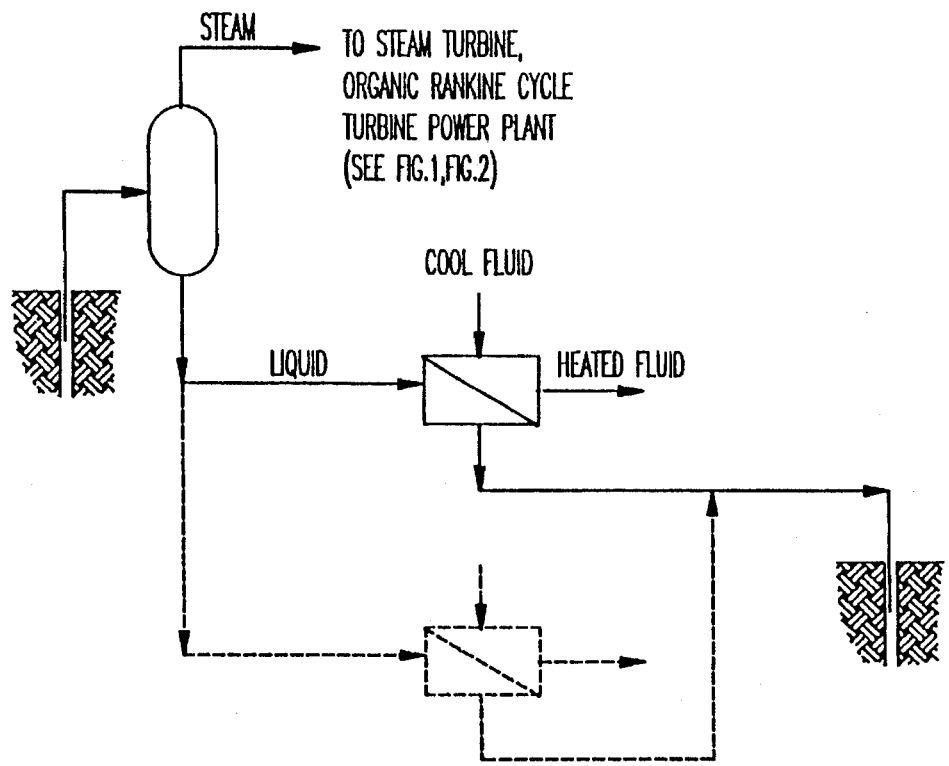
FIG. 3 is a block diagram which represents, in a schematic way, an additional embodiment of a power plant in accordance with the present invention.
Figure 4:
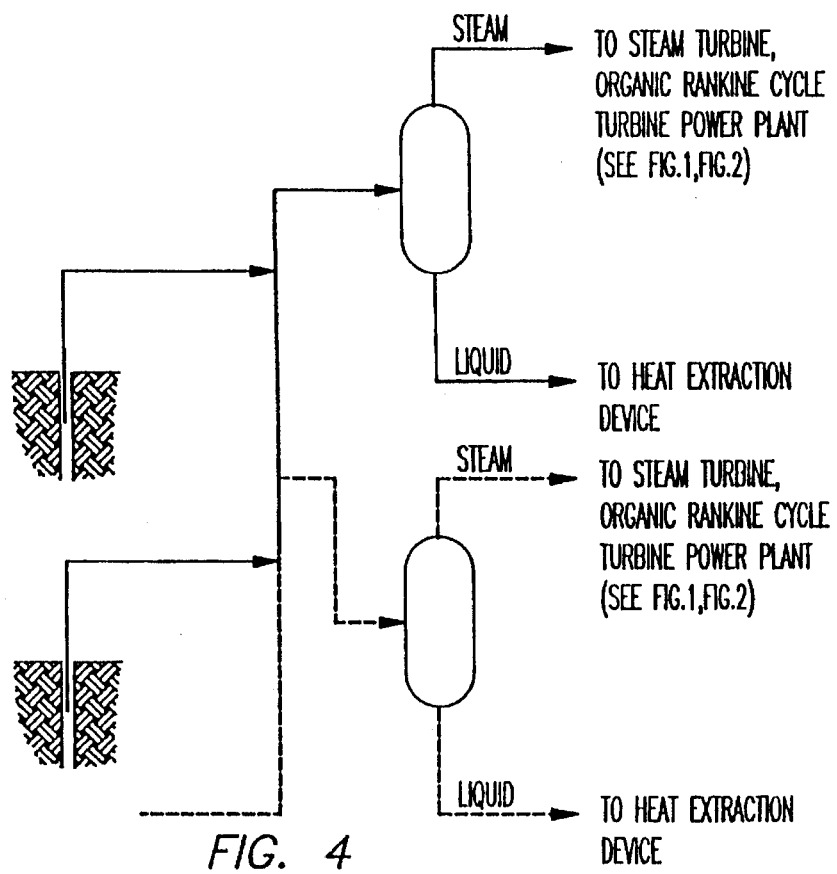
FIG. 4 is a block diagram which represents, in a schematic way, a further embodiment of a power plant in accordance with the present invention.

Actually, when only single modules 15A and 15B are used, a configuration such as the one shown in FIG. 2—is preferred. In the embodiment shown in FIG. 2, the steam turbine and organic, Rankine cycle turbine run or operate a shared, electric generator interposed between the the steam turbine and organic, Rankine cycle turbine which can be coupled to the steam turbine and organic turbine respectively by suitable couplings such as clutches or even selectively operable clutches if preferred. While in FIGS. I and 2 preheaters 18A and 18C are respectively shown, it can be incorporated in the same heat exchanger as organic vaporizers 14A and 14C respectively. Furthermore, while in FIGS. I and 2, the separated geothermal liquid or brine is shown as operating an organic Rankine cycle power plant module or modules, alternatively a heat exchanger or heat exchangers as shown in FIG. 3 may merely be used for extracting heat from the brine for useful purposes. In addition, while a single geothermal well is shown in Pigs 1 and 2, alternatively several wells can be used for supplying geothermal fluid to one or a number of separators as shown in FIG. 4.

Furthermore, will the above description refers to an organic fluid for operating organic turbines 16A and 21B, the preferred organic fluid used is pentane or isopentane.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A method for producing power from geothermal fluid containing non-condensable gases that include carbon dioxide, said method comprising:

a) separating the geothermal fluid into geothermal steam and geothermal liquid;

b) expanding said steam for producing power and lower pressure steam, condensing said lower pressure steam in a steam condenser using an organic fluid for producing steam condensate and vaporized organic fluid vapor;

c) extracting non-condensable gases from said steam condenser and compressing said non-condensable gases;

d) expanding said organic fluid vapor for producing power and lower pressure organic fluid vapor, condensing said lower pressure organic fluid vapor for producing organic fluid condensate, preheating said organic fluid condensate with said steam condensate for producing cooled steam condensate and preheated organic fluid, and supplying the preheated organic fluid to said steam condenser;

e) supplying said geothermal liquid to a heat exchanger containing additional organic fluid for producing additional organic fluid vapor as well as cooled geothermal liquid;

f) expanding said additional organic fluid vapor for producing power and lower pressure additional organic fluid vapor, condensing said lower pressure additional organic fluid vapor for producing additional organic fluid condensate, and supplying said additional organic fluid condensate to said heat exchanger;

g) introducing the compressed non-condensable gases into said cooled geothermal liquid for forming geothermal liquid effluent; and h) disposing of said geothermal liquid effluent.

2. A method according to claim 1 including:

a) combining said cooled steam condensate and said cooled geothermal liquid for further cooling said cooled geothermal liquid and producing a mixture, and introducing the compressed non-condensable gases into said mixture for forming an effluent in which said carbon dioxide is dissolved thereby reducing the pH of the mixture; and b) passing the effluent through an injection line into an injection well in said geothermal fluid resource such that the reduction in pH enhances the inhibition of scale deposition in said injection line and said injection well.

3. A method according to claim 2 wherein the separation of the geothermal fluid is carried out at a pressure of at least 6 atmospheres.

4. A method according to claim 2 wherein the condensation of said lower pressure steam is carried out at a pressure greater than atmospheric pressure.

5. A method according to claim 2 including carrying out the steps of the method such that the temperature of the cooled geothermal liquid is about 140° C., the temperature of the cooled steam condensate is about 50° C. and the temperature of the mixed, cooled and diluted geothermal liquid is about 100° C.

6. A method according to claim 2 including carrying out the steps of the method such that the pH of said cooled geothermal liquid is at least 5.0.

7. A method according to claim 2 including carrying out the steps of the method by locating the injection well is located distant from said production well.

8. A method according to claim 2 including carrying out the steps of the method such that the concentration of silica in the mixed, cooled and diluted geothermal liquid is at least 400 ppm.

9. Apparatus for producing power from geothermal fluid containing non-condensable gases that include carbon dioxide, said apparatus comprising:

a) a separator for separating the geothermal fluid into geothermal steam and geothermal liquid;

b) a steam turbine coupled to a generator, and responsive to said geothermal steam for producing power and lower pressure steam;

c) a steam condenser for receiving said low pressure steam and containing an organic fluid for producing steam condensate and vaporized organic fluid vapor;

d) means for extracting non-condensable gases from said steam condenser and compressing said non-condensable gases;

e) an organic vapor turbine coupled to a generator, and responsive to said organic fluid vapor for producing power and lower pressure organic fluid vapor;

f) an organic vapor condenser for condensing said lower pressure organic fluid vapor for producing organic fluid condensate;

g) a preheater for preheating said organic fluid condensate with said steam condensate for producing cooled steam condensate and preheated organic fluid;

h) means for supplying the preheated organic fluid to said steam condenser;

i) a further heat exchanger containing additional organic fluid and responsive to said geothermal liquid for producing additional organic fluid vapor as well as cooled geothermal liquid;

j) an additional organic vapor turbine coupled to an additional generator, and responsive to said additional organic fluid vapor for producing power and lower pressure additional organic fluid vapor;

k) an additional organic vapor condenser for condensing said lower pressure additional organic fluid vapor for producing additional organic fluid condensate;

l) means for supplying said additional organic fluid condensate to said further heat exchanger;

m) means for introducing said compressed non-condensable gases into said cooled steam condensate for forming steam condensate effluent; and n) a re-injection well for disposing of said steam condensate effluent.

10. Apparatus according to claim 9 including:

a) means for combining said cooled steam condensate with said cooled geothermal liquid for producing a mixture;

b) means for introducing the compressed non-condensable gases into said mixture to form an effluent in which said carbon dioxide is dissolved thereby reducing the pH of the mixture; and c) an injection line for injecting the effluent into said re-injection well in said geothermal fluid resource such that scale deposition is inhibited in said re-injection well and in said injection line.

11. Apparatus according to claim 10 wherein said steam turbine and said organic vapor turbine are each coupled to a single generator.

12. Apparatus for producing power from geothermal fluid containing minerals, and non-condensable gases that include carbon dioxide, said apparatus comprising:

a) a separator for separating the geothermal fluid into geothermal steam and geothermal liquid;

b) first heat transfer apparatus responsive to said geothermal steam for producing power, steam condensate, and compressed non-condensable gases;

c) second heat transfer apparatus responsive to said geothermal liquid for producing power and cooled geothermal liquid at a temperature above the temperature of said steam condensate;

d) an injection line for mixing said cooled steam condensate with said cooled geothermal liquid to produce an effluent; and e) means for injecting said compressed non-condensable gases into the effluent thereby reducing its PH and inhibiting mineral precipitation in said injection line.

13. A method for producing power from geothermal fluid containing minerals, and non-condensable gases that include carbon dioxide, said method comprising:

a) separating the geothermal fluid into geothermal steam and geothermal liquid;

b) using said geothermal steam to produce power, steam condensate, and compressed non-condensable gases;

c) using said geothermal liquid to produce power and cooled geothermal liquid at a temperature above the temperature of said steam condensate;

d) mixing said cooled steam condensate with said cooled geothermal liquid to produce an effluent at a temperature below the temperature of said cooled geothermal liquid; and e) reducing the pH value of said effluent by injecting the compressed non-condensable gases into said effluent thereby inhibiting mineral precipitation in said injection line.

* * * * *